(12) United States Patent
Asayama et al.

(10) Patent No.: US 11,288,882 B2
(45) Date of Patent: Mar. 29, 2022

(54) DEPOSIT DETECTION DEVICE AND DEPOSIT DETECTION METHOD

(71) Applicant: DENSO TEN Limited, Kobe (JP)

(72) Inventors: Nobunori Asayama, Kobe (JP); Nobuhisa Ikeda, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/018,126

(22) Filed: Sep. 11, 2020

(65) Prior Publication Data
US 2021/0089809 A1 Mar. 25, 2021

(30) Foreign Application Priority Data

Sep. 20, 2019 (JP) .............................. JP2019-172216

(51) Int. Cl.
*G06V 10/60* (2022.01)
*G01N 21/94* (2006.01)
*G06T 7/00* (2017.01)
*G06V 10/50* (2022.01)

(52) U.S. Cl.
CPC ............ *G06V 10/60* (2022.01); *G01N 21/94* (2013.01); *G06T 7/0002* (2013.01); *G06V 10/50* (2022.01); *G01N 2021/945* (2013.01); *G06T 2207/20021* (2013.01); *G06T 2207/30248* (2013.01)

(58) Field of Classification Search
CPC ............ G06K 9/4661; G06K 9/4642; G06K 9/00791; G06K 9/3233; G01N 21/94; G01N 2021/945; G01N 2021/8864; G01N 2021/8887; G01N 21/8851; G01N 2021/8427; G06T 7/0002; G06T 2207/20021; G06T 2207/30248; G06T 2207/30252; G06T 2207/30168
See application file for complete search history.

(56) References Cited

U.S. PATENT DOCUMENTS 10,218,961 B2 * 2/2019 Kishiwada .............. B60R 11/04
10,789,502 B2 * 9/2020 Asayama ............. G06K 9/4642
11,128,795 B2 * 9/2021 Youn .................. H04N 5/23222
(Continued)

FOREIGN PATENT DOCUMENTS

JP          2018-176897 A        11/2018

*Primary Examiner* — Xuemei G Chen
(74) *Attorney, Agent, or Firm* — Oliff PLC

(57) ABSTRACT

A deposit detection device according to an embodiment includes a detection module, a determination module, and an identification module. The detection module detects a deposit region corresponding to a deposit adhering to an imaging device, based on brightness information of an image captured by the imaging device. The determination module determines whether variation in brightness information in a predetermined region of the image is within a predetermined range, in a period after a vehicle is stopped in a state in which the deposit region is detected by the detection module. The identification module identifies brightness information serving as a determination criterion of the deposit region when the determination module determines that the variation in brightness information is within a predetermined range.

4 Claims, 5 Drawing Sheets

(56) References Cited

U.S. PATENT DOCUMENTS

| | | | |
|---|---|---|---|
| 2007/0138393 A1* | 6/2007 | Wemken | G01N 21/15 250/353 |
| 2015/0069224 A1* | 3/2015 | Yoshimura | B60S 1/0833 250/227.14 |
| 2015/0177512 A1* | 6/2015 | Hayakawa | G03B 17/08 348/148 |
| 2016/0165101 A1* | 6/2016 | Akiyama | G06T 7/42 348/187 |
| 2016/0324398 A1* | 11/2016 | Sasaki | G06T 7/0012 |
| 2017/0140227 A1* | 5/2017 | Takemura | G08G 1/166 |
| 2019/0268590 A1* | 8/2019 | Kato | H04N 17/00 |
| 2021/0029272 A1* | 1/2021 | Tao | G06T 7/97 |

* cited by examiner

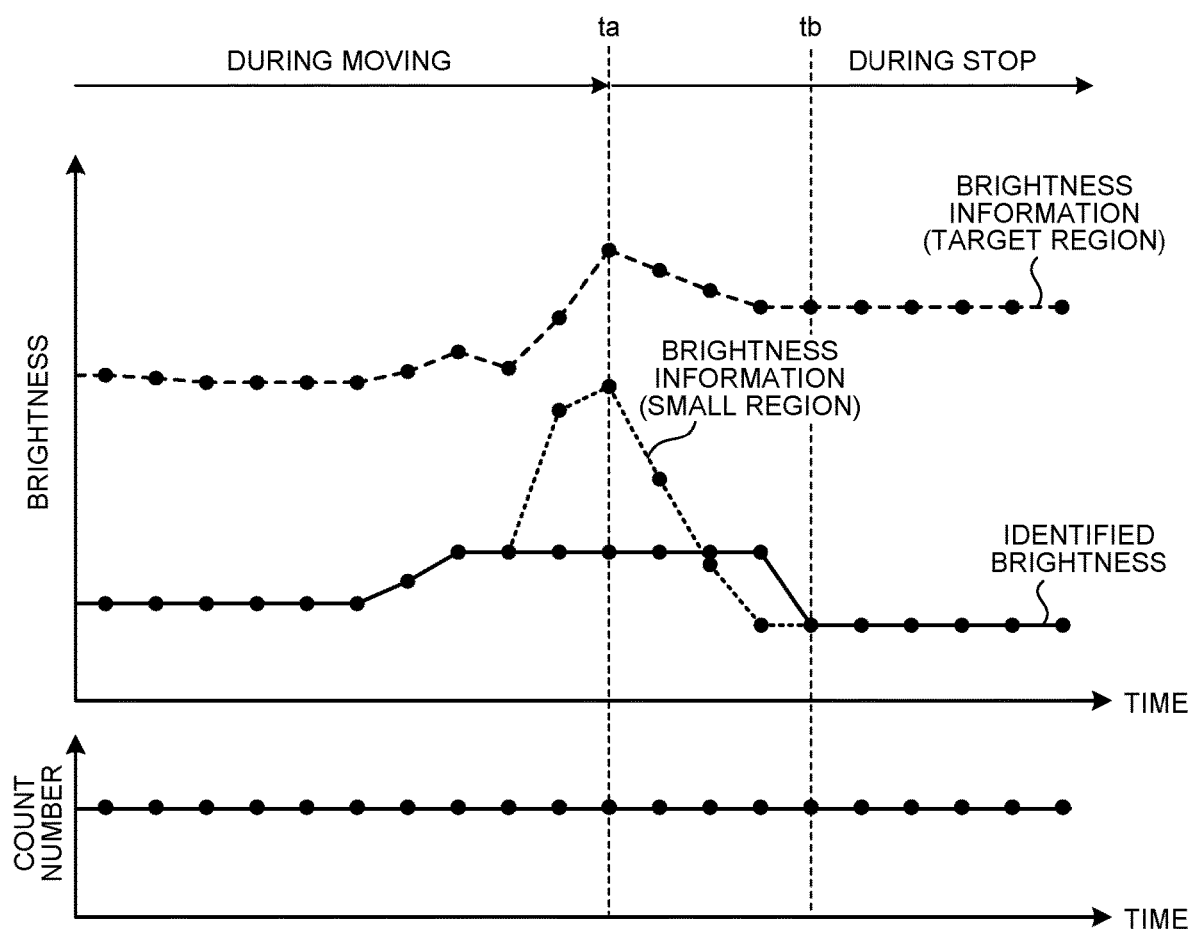

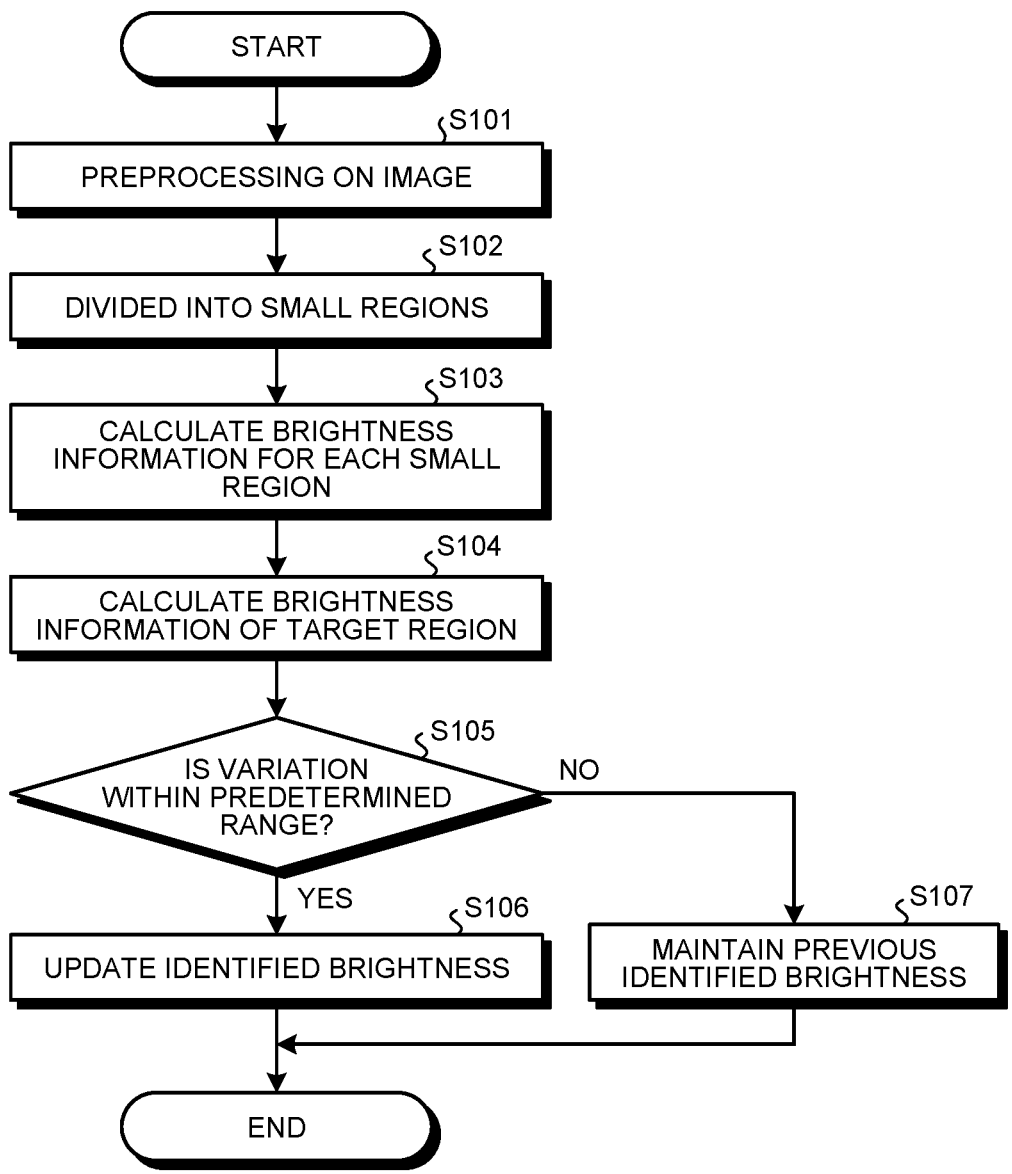

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172216, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known which detects a region corresponding to a deposit adhering to a lens of an imaging device (hereinafter referred to as deposit region), based on variation in brightness information in captured images while a vehicle is moving (for example, refer to Japanese Laid-open Patent Publication No. 2018-176897). In a deposit detection device of this type, when it is determined whether the deposit has been removed during stop of a vehicle, deposit removal determination is performed by comparing brightness information in the past immediately before the vehicle is stopped with brightness information at present.

Unfortunately, conventionally, since the removal determination is performed with reference to the brightness information identified immediately before the vehicle is stopped, there may be great variation in brightness information before and after the vehicle is stopped due to abrupt change in lightness of the surrounding when the vehicle is stopped immediately after entering a building. In this case, the brightness information may be identified in a state in which the brightness information temporarily varies greatly immediately before the vehicle is stopped and, if this brightness information is used as a reference, it may be erroneously determined that the deposit has been removed. In this way, the conventional technique has room for improvement in detecting a deposit with high accuracy.

SUMMARY

A deposit detection device according to an embodiment includes a detection module, a determination module, and an identification module. The detection module detects a deposit region corresponding to a deposit adhering to an imaging device, based on brightness information of an image captured by the imaging device. The determination module determines whether variation in brightness information in a predetermined region of the image is within a predetermined range, in a period after a vehicle is stopped in a state in which the deposit region is detected by the detection module. The identification module identifies brightness information serving as a determination criterion of the deposit region when the determination module determines that the variation in brightness information is within a predetermined range.

BRIEF DESCRIPTION OF DRAWINGS

FIG. 4 is a diagram illustrating a process in a control unit; and

FIG. 5 is a flowchart illustrating a procedure of a process performed by the deposit detection device according to the embodiment.

DESCRIPTION OF EMBODIMENTS

Embodiments of a deposit detection device and a deposit detection method disclosed by the subject application will be described in detail below with reference to the accompanying drawings. It should be noted that the present invention is not limited by the embodiments illustrated below.

Figure 1:
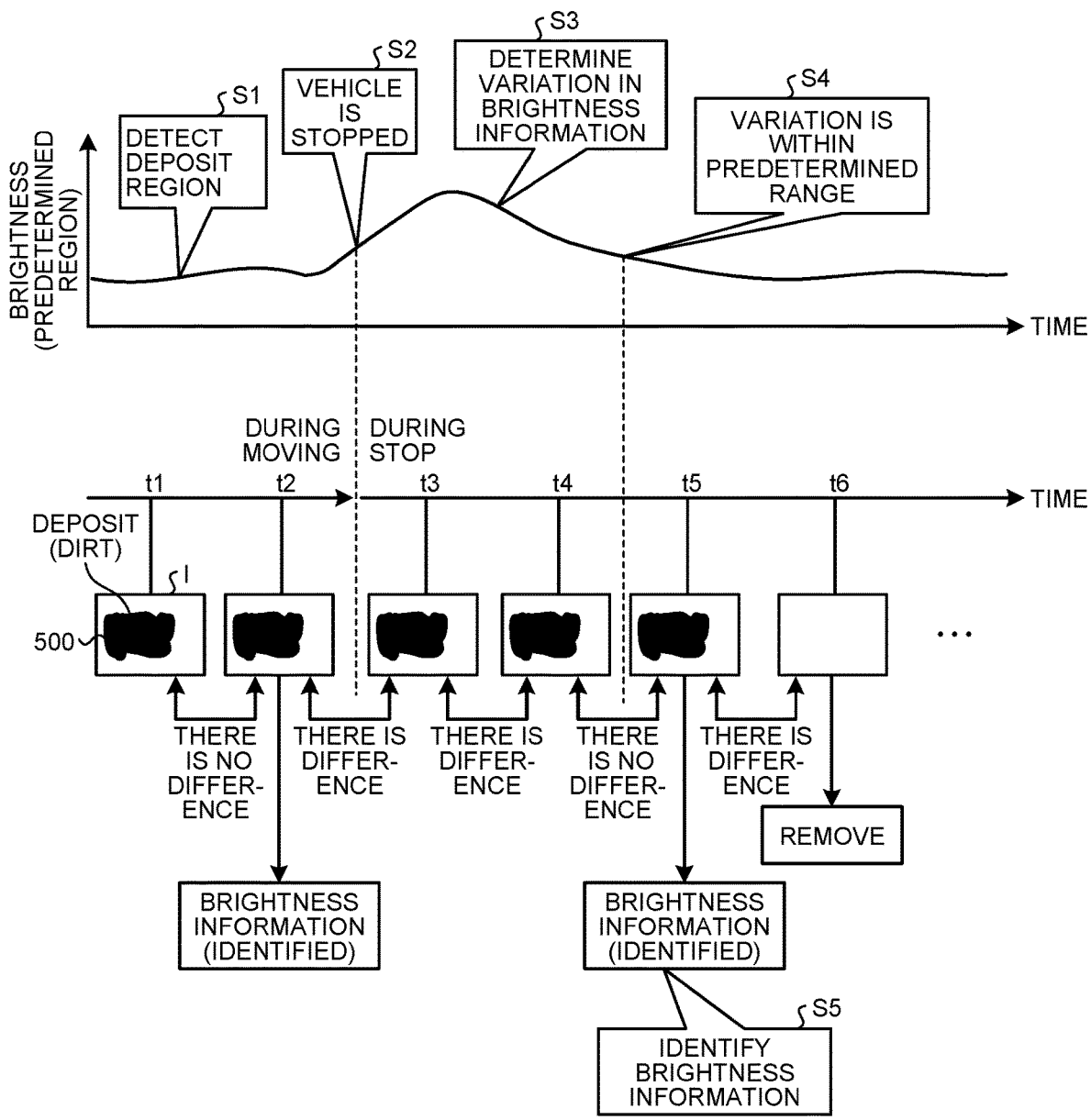
FIG. 1 is a diagram illustrating an overview of a deposit detection method according to an embodiment.

First, referring to FIG. 1, an overview of the deposit detection method according to an embodiment will be described. FIG. 1 is a diagram illustrating an overview of the deposit detection method according to the embodiment. FIG. 1 illustrates an image I (hereinafter, captured image I) captured, for example, in a state in which a light-blocking deposit such as dirt adheres to a lens of a camera (an example of imaging device) mounted on a vehicle. When such a light-blocking deposit adheres, a deposit region in the captured image I is in a blocked-up shadow state. The light-blocking deposit includes dirt as well as insects and dust.

As illustrated in FIG. 1, in the deposit detection method according to the embodiment, first of all, a deposit region 500 corresponding to a deposit adhering to the lens of the camera is detected based on brightness information of the captured image I (step S1). The detail of the method of detecting the deposit region 500 will be described later. For example, it is assumed that the deposit region 500 is detected at time t1.

Subsequently, it is determined whether the difference between brightness information of the deposit region 500 of at 50 ft. the captured image I at time t2 and brightness at 30 lumens of 4% information of the deposit region 500 of the captured image I at time t1 is within a predetermined range. In FIG. 1, the difference between the brightness information at time t2 and the brightness information at time t1 is within the predetermined range, and thus determined that "there is no difference".

Then, in the deposit detection method according to the embodiment, when it is determined that "there is no difference", the brightness information at time t2 is identified as the latest brightness information of the deposit region 500. The identified brightness information serves as a reference in calculating variation in brightness information of the deposit region 500 in the next and subsequent processes. Hereinafter, the identified brightness information may be referred to as identified brightness.

Here, in the conventional deposit detection method, in a period after a vehicle is stopped, deposit removal determination is performed with reference to the brightness information identified immediately before the vehicle is stopped. Referring to FIG. 1, conventionally, the difference from the brightness information of the captured image I captured at time t3, time t4, or the like after the vehicle is stopped is calculated with reference to the identified brightness at time t2. That is, after the vehicle is stopped, the identified brightness is not updated, and the difference in brightness information is calculated using the identified brightness immediately before the vehicle is stopped.

However, for example, when the vehicle is stopped immediately after entering a building, the lightness of the surrounding abruptly changes before and after the vehicle is stopped, and the brightness information immediately before the vehicle is stopped may temporarily vary greatly. In this case, the brightness information that temporarily varies greatly immediately before the vehicle is stopped may be identified as identified brightness, and it may be erroneously detected as deposit removal if this identified brightness is used as a reference.

Then, in the deposit detection method according to the embodiment, the identified brightness is updated after the brightness of a predetermined region in the captured image I is stabilized in a period after the vehicle is stopped.

Specifically, first, in the example illustrated in FIG. 1, it is assumed that the vehicle is stopped between time t2 and time t3 (step S2). In the deposit detection method according to the embodiment, in a period after the vehicle is stopped in a state in which the deposit region 500 is detected, it is determined whether variation in brightness information of a predetermined region (a target region ROI or a small region 100 described later) in the captured image I is within a predetermined range (step S3). The predetermined region may be the deposit region 500 alone or may be a region including a region other than the deposit region 500.

Then, in the deposit detection method according to the embodiment, it is assumed that it is determined that variation in brightness information in the predetermined region is within the predetermined range between time t4 and time t5 (step S4). In such a case, in the deposit detection method according to the embodiment, when the difference in brightness information of the deposit region 500 between the captured image I at time t4 and the captured image I at time t5 is within the predetermined range, it is determined that "there is no deposit", and the brightness information serving as a determination criterion of the deposit region 500 is identified (step S5). That is, assuming that the brightness of the captured image I is stabilized in a period from time t4 to time t5, the brightness information of the deposit region 500 at time t5 is identified as the identified brightness.

Then, it is assumed that the deposit has been removed between time t5 and time t6. In such a case, in the deposit detection method according to the embodiment, since the difference between the identified brightness at time t5 serving as a determination criterion of the deposit region 500 and the brightness information of the deposit region 500 of the captured image I at time t6 is outside the predetermined range, it is determined that "there is a difference", and it is determined that the deposit has been removed.

In this way, in the deposit detection method according to the embodiment, the brightness information serving as a determination criterion of the deposit region 500 is identified after the brightness of the captured image I is stabilized in a period after the vehicle is stopped, whereby even when the brightness of the captured image I is temporarily unstable before and after the vehicle is stopped, the brightness information is updated after the vehicle is stopped and, therefore, erroneous detection of the deposit region 500 can be suppressed. That is, the deposit detection method according to the embodiment can detect a deposit with high accuracy.

Figure 2:
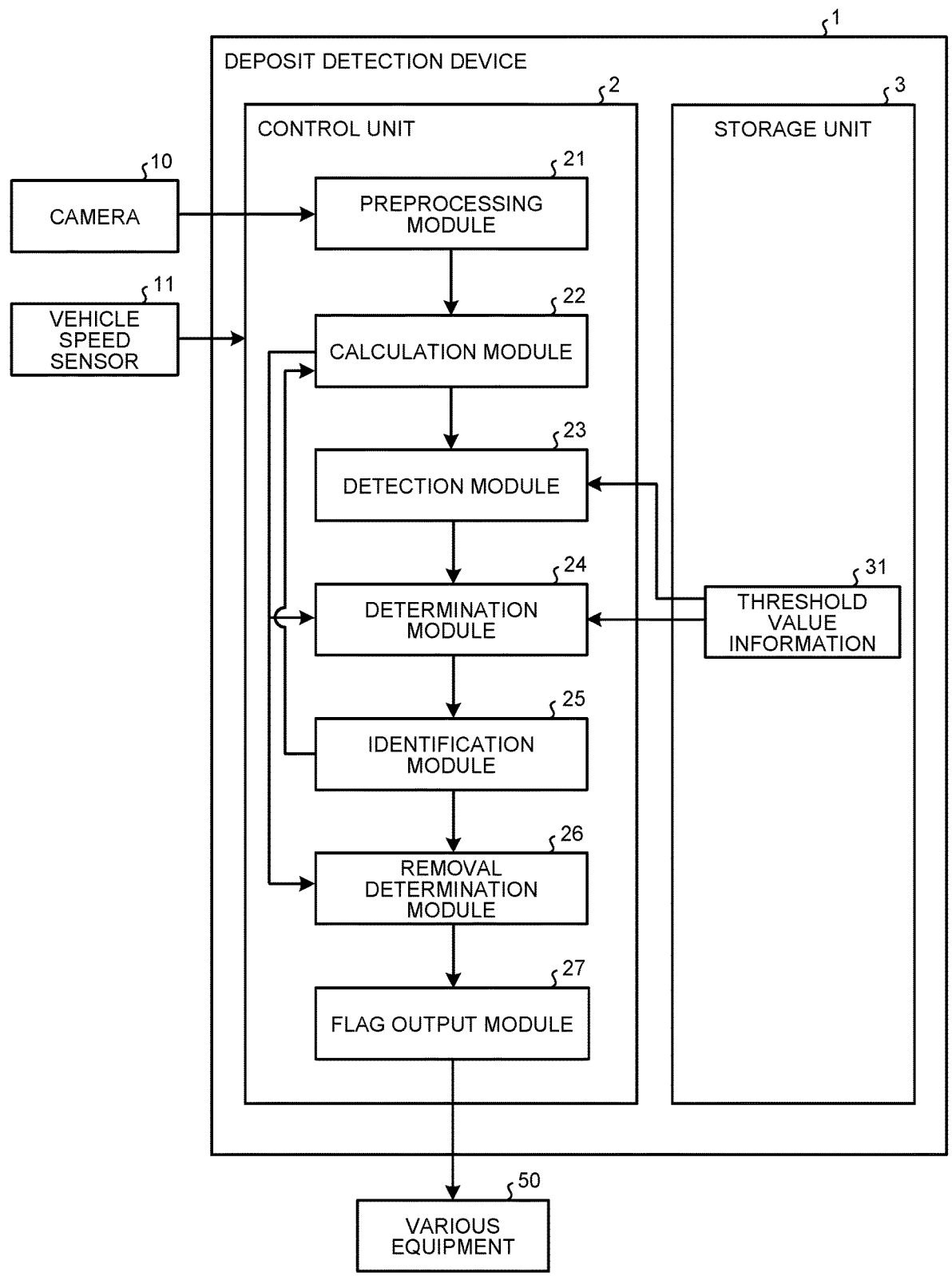
FIG. 2 is a block diagram illustrating a configuration of a deposit detection device according to the embodiment.

Referring now to FIG. 2, a configuration of a deposit detection device 1 according to an embodiment will be described. FIG. 2 is a block diagram illustrating the configuration of the deposit detection device 1 according to an embodiment. As illustrated in FIG. 2, the deposit detection device 1 according to an embodiment is connected with a camera 10, a vehicle speed sensor 11, and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, left side, and right side of the vehicle can be captured, and output the captured images I to the deposit detection device 1.

The vehicle speed sensor 11 is a sensor that detects the speed of the vehicle. The vehicle speed sensor 11 outputs information on the detected vehicle speed to the deposit detection device 1.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

As illustrated in FIG. 2, the deposit detection device 1 according to an embodiment includes a control unit 2 and a storage unit 3. The control unit 2 includes a preprocessing module 21, a calculation module 22, a detection module 23, a determination module 24, an identification module 25, a removal determination module 26, and a flag output module 27. The storage unit 3 stores therein threshold value information 31.

Here, the deposit detection device 1 includes, for example, a computer having a central processing unit (CPU), a read-only memory (ROM), a random-access memory (RAM), a flash memory, and an input-output port, and a variety of circuits.

The CPU of the computer reads and executes a computer program stored in the ROM, for example, to function as the preprocessing module 21, the calculation module 22, the detection module 23, the determination module 24, the identification module 25, the removal determination module 26, and the flag output module 27 of the control unit 2.

At least one or all of the preprocessing module 21, the calculation module 22, the detection module 23, the determination module 24, the identification module 25, the removal determination module 26, and the flag output module 27 of the control unit 2 may be configured by hardware such as an application specific integrated circuit (ASIC) and a field-programmable gate array (FPGA).

The storage unit 3 corresponds to, for example, the RAM, the ROM, and the flash memory. The RAM, the ROM, and the flash memory can store therein the threshold value information 31 and information of a variety of computer programs. The deposit detection device 1 may acquire the computer program and/or a variety of information described above through another computer connected via a wired or wireless network or a portable recording medium.

The threshold value information 31 stored in the storage unit 3 is information such as threshold values used in processes in the detection module 23 and the determination module 24 described later.

The preprocessing module 21 performs predetermined preprocessing on the captured image I captured by the camera 10.

Specifically, the preprocessing module 21 performs a pixel thinning process on the acquired captured image I and generates an image having a size smaller than the acquired image. The preprocessing module 21 also generates an integrated image of the sum and the sum of squares of pixel values in the pixels, based on the image subjected to the thinning process. As used herein, the pixel value is information corresponding to brightness or an edge of a pixel.

In this way, the deposit detection device 1 can accelerate calculation in the processes in the subsequent stages by performing the thinning process on the acquired image and generating the integrated image and can reduce the process time for detecting a deposit.

The preprocessing module 21 may perform a smoothing process for each pixel, using a smoothing filter such as an averaging filter. The preprocessing module 21 does not necessarily perform the thinning process and may generate an integrated image of the captured image I having the same size as that of the acquired image.

The preprocessing module 21 outputs the captured image I that is an integrated image to the calculation module 22.

Figure 3:
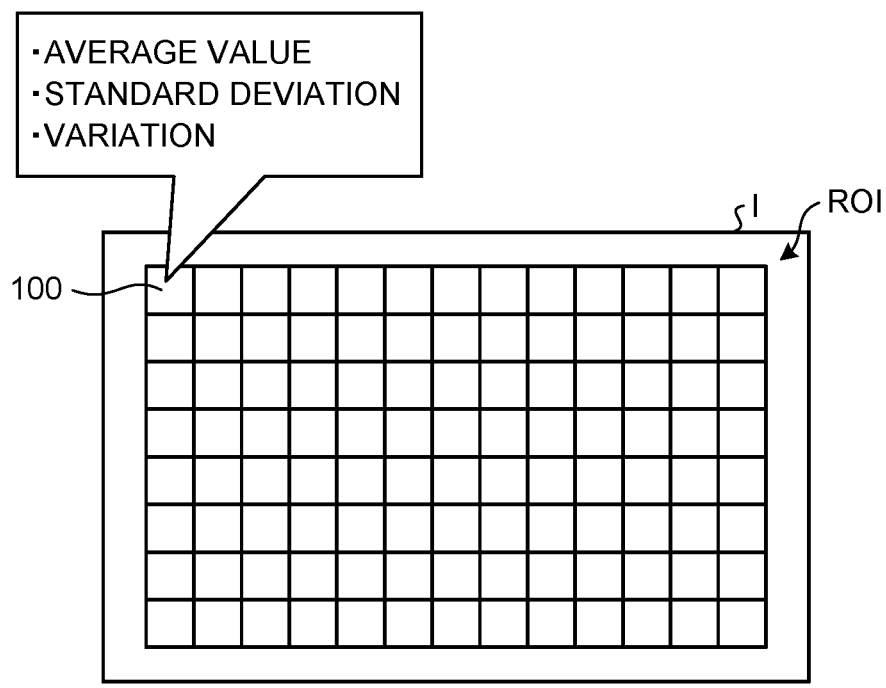
FIG. 3 is a diagram illustrating a process in a calculation module.

The calculation module 22 calculates brightness information indicating a feature amount of brightness for each of small regions 100 into which the target region ROI of the captured image I is divided. Referring now to FIG. 3, a process in the calculation module 22 will be described. FIG. 3 is a diagram illustrating the process in the calculation module 22.

As illustrated in FIG. 3, the calculation module 22 first sets a target region ROI and small regions 100 in the captured image I. The target region ROI is a rectangular region preset according to the characteristics of the camera 10 and is a region, for example, excluding a vehicle body region and a housing region of the camera 10. The small regions 100 are rectangular regions formed by dividing the target region ROI in the horizontal direction and the vertical direction. For example, each small region 100 is a region including 40×40 pixels, but the number of pixels included in the small region 100 can be set as desired.

Subsequently, the calculation module 22 calculates brightness information indicating a feature amount of brightness for each small region 100. Specifically, the calculation module 22 calculates an average value of brightness (brightness average) and a standard deviation of brightness (brightness standard deviation) as a feature amount, for each small region 100. The calculation module 22 also calculates a feature amount of brightness (an average value of brightness and a standard deviation of brightness) in the entire target region ROI.

Subsequently, the calculation module 22 calculates a variation in feature amount of brightness in the captured images I from the past to the present. Specifically, the calculation module 22 calculates, as a variation, a first difference that is a difference in average value of brightness in the small region 100 at the same position in the past and at present in the captured images I. That is, the calculation module 22 calculates, as a variation, the first difference between the average value of brightness in the past and the average value of brightness at present for the corresponding small region 100.

The calculation module 22 also calculates a second difference that is a difference in standard deviation of brightness in the small region 100 at the same position in the past and at present of the captured images I. That is, the calculation module 22 calculates, as a variation, the second difference between the standard deviation of brightness in the past and the standard deviation of brightness at present for the corresponding small region 100.

The calculation module 22 also calculates the first difference and the second difference with reference to the brightness information (identified brightness) identified by the identification module 25 described later in a period after the vehicle is stopped.

The calculation module 22 outputs the calculated brightness information to the detection module 23, the determination module 24, and the removal determination module 26.

The detection module 23 detects the deposit region 500 corresponding to a deposit adhering to the lens of the camera 10, based on the brightness information calculated by the calculation module 22. For example, the detection module 23 performs a detection process using threshold values included in the threshold value information 31. Specifically, the detection module 23 determines whether the small region 100 satisfies all of the following conditions (1) to (3). When the small region 100 does not satisfy at least one of the conditions (1) to (3), the small region 100 is detected as a non-deposit region in which a deposit does not adhere.

(1) The first difference of the small region 100 is equal to or smaller than a predetermined value.

(2) The second difference of the small region 100 is equal to or smaller than a predetermined value.

(3) The brightness average of the small region 100 is equal to or smaller than a predetermined threshold value.

Subsequently, when the number of small regions 100 in which a count number indicating the number of times all of the conditions (1) to (3) above are satisfied is equal to or larger than a predetermined number is equal to or larger than a predetermined number, the detection module 23 detects the predetermined number of small regions 100 as the deposit region 500. That is, the detection module 23 detects, as the deposit region 500, a set of the predetermined number of small regions 100 in which the state of satisfying all of the conditions (1) to (3) continues a predetermined number of times or more.

The determination module 24 determines whether variation in brightness information in the predetermined region (for example, the target region ROI or the small region 100) of the captured image I is within a predetermined range, in a period after the vehicle is stopped in a state in which the deposit region 500 is detected by the detection module 23. For example, the determination module 24 performs a determination process as to whether variation in brightness information is within a threshold value range included in the threshold value information 31.

For example, when the difference in brightness average (average value of brightness) in the predetermined region between the captured image I at present and the captured image I in the past is smaller than a predetermined value, the determination module 24 determines that variation in brightness information is within the predetermined range. With this process, variation in brightness information can be determined with high accuracy, for example, in a case where the gain of the captured image I is temporarily adjusted widely due to abrupt change in lightness of the surrounding and the brightness value of the entire image becomes high or low.

The determination module 24 may determine whether variation in brightness information is within the predetermined range, based on the difference in standard deviation of brightness in the predetermined region between the captured image I at present and the captured image I in the past.

The determination module 24 may determine whether variation in brightness information of at least one of the target region ROI and the small region 100 that are the predetermined region is within the predetermined range or may determine whether variation in brightness information of both of the target region ROI and the small region 100 is within the predetermined range.

The identification module 25 identifies brightness information serving as a determination criterion of the deposit region 500 when the determination module 24 determines that variation in brightness information in the predetermined region of the captured image I is within the predetermined range. The detail of the process by the identification module 25 will be described later with reference to FIG. 4.

The identification module 25 outputs the identified brightness information of the deposit region 500 to the calculation module 22 and the removal determination module 26.

The removal determination module 26 determines whether the deposit has been removed, based on the brightness information identified by the identification module 25, in a period in which the vehicle is stopped. Specifically, the removal determination module 26 determines that the deposit has been removed when a state in which variation (the first difference and the second difference) in brightness information calculated by the calculation module 22 based on the brightness information identified by the identification module 25 is outside the predetermined range continues.

More specifically, the calculation module 22 calculates variation from the brightness information of each of the time-series captured images I with reference to the identified brightness at predetermined time. The removal determination module 26 then determines that the deposit has been removed when a state in which variation from the brightness information of the captured image I is outside the predetermined range successively occurs in time series. For example, the removal determination module 26 may perform a process of decrementing the aforementioned count number in the detection module 23 every time variation from the brightness information of the captured image I is outside the predetermined range, and may finally determine that the deposit has been removed when this count number is smaller than a predetermined value.

In this way, the removal determination module 26 can perform the deposit removal determination with high accuracy, using the brightness information of the deposit region 500 identified by the identification module 25.

The flag output module 27 outputs a flag corresponding to the presence/absence of the deposit region 500. For example, the flag output module 27 outputs a deposit flag ON to the various equipment 50 when the deposit region 500 is present, that is, when the removal determination module 26 does not determine that the deposit has been removed. On the other hand, the flag output module 27 outputs a deposit flag OFF to the various equipment 50 when the deposit region 500 is not present, that is, when the removal determination module 26 determines that the deposit has been removed.

Referring now to FIG. 4, a process in the control unit 2 will be specifically described. FIG. 4 is a diagram illustrating the process in the control unit 2. FIG. 4 illustrates a graph of variation in brightness information of the captured image I in a case where the lightness of the surrounding of the vehicle changes abruptly before and after the vehicle is stopped. This graph illustrates brightness information of the target region ROI, brightness information of the small region 100 included in the deposit region 500, and the identified brightness identified by the identification module 25. The values (each dot) in the graph are the brightness information and the identified brightness based on the captured image I captured at each time.

The lower section of FIG. 4 illustrates a count number for detecting the deposit region 500 in the detection module 23. In FIG. 4, the count number keeps the maximum value since the deposit region 500 has already been detected.

As illustrated in FIG. 4, the brightness information of the target region ROI and the small region 100 varies greatly before and after time ta at which the vehicle is stopped, and the brightness information of the target region ROI and the small region 100 is stable at time tb.

Thus, the identification module 25 does not update the identified brightness in a period from time ta to time tb and maintains the identified brightness before time ta, even after time ta. In a period from time ta to time tb, the removal determination by the removal determination module 26 is not performed either. That is, in a period from time ta to time tb, the count number is not decreased and is maintained even if variation in brightness information of the deposit region 500 is outside the predetermined range.

Then, at time tb, the determination module 24 determines that the brightness information of the target region ROI and the small region 100 becomes stable, that is, variation in brightness information in the predetermined region is within the predetermined range, and the identification module 25 identifies the brightness information at time tb and updates the identified brightness. With this process, the deposit removal determination by the removal determination module 26 can be performed with high accuracy after time tb.

As illustrated in FIG. 4, for the identified brightness immediately before the vehicle is stopped (for example, two pieces of identified brightness immediately before time ta), the identification module 25 may prevent updating of the identified brightness when the vehicle speed is smaller than a predetermined value and almost in a stopped state. This configuration can reduce temporary great variation of the identified brightness when the brightness information temporarily varies greatly immediately before the vehicle is stopped.

Referring now to FIG. 5, a procedure of a process performed by the deposit detection device 1 according to the embodiment will be described. FIG. 5 is a flowchart illustrating the procedure of the process performed by the deposit detection device 1 according to the embodiment. FIG. 5 illustrates the process in a case where the vehicle is stopped in a state in which the deposit region 500 is detected.

As illustrated in FIG. 5, the preprocessing module 21 performs preprocessing on the captured image I in a period in which the vehicle is stopped in a state in which the deposit region 500 is detected (step S101). As used herein, the preprocessing is, for example, a process of generating an integrated image based on pixel values of a reduced image after a gray-scale process and the thinning process are performed.

Subsequently, the calculation module 22 divides a target region ROI in the captured image I into small regions 100 (step S102).

Subsequently, the calculation module 22 calculates brightness information indicating a feature amount of brightness for each small region 100 (step S103). The feature amount of brightness is, for example, an average value of brightness and a standard deviation of brightness.

Subsequently, the calculation module 22 calculates brightness information indicating a feature amount of brightness of the target region ROI (step S104).

Subsequently, the determination module 24 determines whether variation in brightness information in a predetermined region of the captured image I is within a predetermined range (step S105).

If variation in brightness information in the predetermined region of the captured image I is within the predetermined range (Yes at step S105), the identification module 25 updates the identified brightness of the deposit region 500 (step S106) and terminates the process. That is, the identification module 25 identifies the brightness information serving as a determination criterion of the deposit region 500.

On the other hand, if variation in brightness information in the predetermined region of the captured image I is not within the predetermined range at step S105 (No at step S105), the identification module 25 maintains the previous identified brightness of the deposit region 500 (step S107) and terminates the process. That is, the identification module 25 maintains the brightness information already identified at the preceding time.

As described above, the deposit detection device 1 according to the embodiment includes the detection module 23, the determination module 24, and the identification module 25. The detection module 23 detects a deposit region 500 corresponding to a deposit adhering to an imaging device, based on brightness information of a captured image I captured by the imaging device (camera 10). The determination module 24 determines whether variation in brightness information in a predetermined region of the captured image I is within a predetermined range, in a period after a vehicle is stopped in a state in which the deposit region 500 is detected by the detection module 23. The identification module 25 identifies brightness information of the deposit region 500 when the determination module 24 determines that variation in brightness information is within a predetermined range. With this configuration, a deposit can be detected with high accuracy.

In the foregoing embodiment, the captured image I captured by a camera mounted on a vehicle is used. However, the captured image I may be, for example, a captured image I captured by a security camera or a camera installed on a street lamp. That is, the captured image I may be any captured image captured by a camera with a lens to which a deposit may adhere.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
    a processor configured to:
        detect a deposit region corresponding to a deposit adhering to an imaging device, based on brightness information of an image captured by the imaging device;
        determine whether variation in brightness information in a predetermined region of the image is within a predetermined range, in a period after a vehicle is stopped in a state in which the deposit region is detected and during a turned-on state of the vehicle; and
        identify brightness information serving as a determination criterion of the deposit region when determining that the variation in brightness information is within the predetermined range.

2. The deposit detection device according to claim 1, wherein the processor is further configured to determine that the variation in brightness information is within the predetermined range when a difference in brightness average in a predetermined region between the image at present and the image in past is smaller than a predetermined value.

3. The deposit detection device according to claim 1, wherein the processor is further configured to determine whether the deposit has been removed, based on the brightness information identified by the processor, in a period in which the vehicle is stopped.

4. A deposit detection method comprising:
    detecting a deposit region corresponding to a deposit adhering to an imaging device, based on brightness information of an image captured by the imaging device;
    determining whether variation in brightness information in a predetermined region of the image is within a predetermined range, in a period after a vehicle is stopped in a state in which the deposit region is detected at the detecting and during a turned-on state of the vehicle; and
    identifying brightness information serving as a determination criterion of the deposit region when, at the determining, it is determined that the variation in brightness information is within the predetermined range.

* * * * *